United States Patent
Kollonitsch et al.

[15] 3,666,838

[45] May 30, 1972

[54] PROPENYL AND PROPADIENYLPHOSPHONIC ACIDS 2-PROPADIENYL-4-OXO-1,3-DIOXA-2-PHOSPHANAPHTHALENE-2-OXIDE

[72] Inventors: Janos Kollonitsch, Westfield; George Gal, Watchung, both of N.J.

[73] Assignee: Merck & Co., Inc., Rahway, N.J.

[22] Filed: July 14, 1969

[21] Appl. No.: 841,547

[52] U.S. Cl. .................. 260/937, 260/502.4 R, 260/941, 260/968, 260/969, 260/973, 260/983, 260/989, 424/222
[51] Int. Cl. ................. C07f 9/08, C07f 9/38, C07f 9/40
[58] Field of Search ........................... 260/936, 937

[56] References Cited

UNITED STATES PATENTS 2,944,074   7/1960   Atherton ........................ 260/936

FOREIGN PATENTS OR APPLICATIONS 806,879   1/1959   Great Britain ..................... 260/937

1,122,666   8/1968   Great Britain ..................... 260/937

OTHER PUBLICATIONS

Pudovik et al., Chemical Abstracts, Vol. 64 (1965) page 15,916.
Nesterov et al., Index Chemicus, Vol. 20 (1966) 61,748 and 61,749.
Houben-Weyl, Methoden der Organischen Chemie, 12/1 (1963) pages 437 and 442.

*Primary Examiner*—Joseph Rebold
*Assistant Examiner*—Richard L. Raymond
*Attorney*—J. Jerome Behan, John Frederick Gerkens and I. Louis Wolk

[57] ABSTRACT

Cis-1-propenyl phosphonic acid and propadienylphosphonic acid are made from propargyl alcohol and 2-halo-4-oxo-1,3-dioxa-2-phosphanaphthalene via reaction of the two, rearrangement of the resulting propargyloxy compound, reduction of the propadienylphosphonate thus formed and/or hydrolysis of the ester function. The intermediates for example, 2-propadienyl-4-oxo-1,3-dioxa-2-phosphanaphthalene-2-oxide, are novel compounds.

1 Claim, No Drawings

PROPENYL AND PROPADIENYLPHOSPHONIC ACIDS 2-PROPADIENYL-4-OXO-1,3-DIOXA-2-PHOSPHANAPHTHALENE-2-OXIDE

BACKGROUND OF THE INVENTION

This invention relates to novel methods for preparing cis-1-propenylphosphonic acid and propadienylphosphonic acid. It is concerned also with 2-substituted-4-oxo-1,3-dioxa-2-phosphanaphthalene-2-oxides which are intermediates in such syntheses. The process employs as starting material propargyl alcohol and 2-halo-4-oxo-1,3-dioxa-2-phosphanaphthalene and involves condensation of these products, rearrangement of the material thus obtained, selective reduction of the rearrangement product and finally generation of the free phosphonic acids.

The syntheses of certain propadienylphosphonate esters is described in U.S. Pat. No. 3,197,497, and the reduction of certain propadienylphosphonate esters to 1-propenylphosphonate esters is described in Tetrahedron Letters, No. 1, page 15, 1968. The preparation of cis-propenylphosphonic acid from propargyl alcohol is also described in Belgian Pat. No. 723,076.

The process described herein was not, however, suggested by these publications because prior to our invention it was believed that the 2-propargyloxy-4-oxo-1,3-dioxa-2-phosphanaphthalene-2-oxide, which is a necessary intermediate in the process, would not rearrange to a propadienylphosphonate ester. See, for instance, Nesterov et al., Zh. Obshchei Khimii 35, No. 11, p. 1997 (Engl. Ed.) 1965.

DESCRIPTION OF THE INVENTION

An object of this invention is to provide a novel process for making propadienylphosphonic acid and cis-1-propenylphosphonic acid from known starting materials. Another object is to provide novel compounds which are intermediates in such process. A further object is to provide a method whereby the desired propenyl and propadienylphosphonic acids are obtained in high purity and yield, and by a method which does not require the isolation and purification of intermediate products. A further object is to provide a process wherein the necessity for isolating and purifying intermediates is obviated because the individual reaction steps can be carried out without the generation of substantial amounts of unwanted by-products. Further objects will be evident from the ensuing description of the invention.

According to the present invention, cis-1-propenylphosphonic acid is prepared by the reaction of propargyl alcohol with 2-chloro-4-oxo-1,3-dioxa-2-phosphanaphthalene to produce 2-propargyloxy-4-oxo-1,3-dioxa-2-phosphanaphthalene, and rearrangement of this material to 2-propadienyl-4-oxo-1,3-dioxa-2-phosphanaphthalene-2-oxide. This latter product is selectively hydrogenated catalytically to the corresponding 1'-cis-propenyl ester, i.e., 2-(1'-cis-propenyl)-4-oxo-1,3-dioxa2-phosphanaphthalene-2-oxide. On exposure to water this latter product is converted to the o-carboxyphenyl ester of cis-1-propenylphosphonic acid, and this ester hydrolyzed to the free acid at elevated temperature and/or in the presence of acid.

In an alternative embodiment of the process, the o-carboxyphenyl ester of propadienylphosphonic acid is produced from 2-propadienyl-4-oxo-1,3-dioxa-2-phosphanaphthalene-2-oxide, and this ester then either hydrolyzed to propadienylphosphonic acid or catalytically hydrogenated to the corresponding ester of 1-propenylhosphonic acid. The processes discussed above are set forth in the following structural diagram:

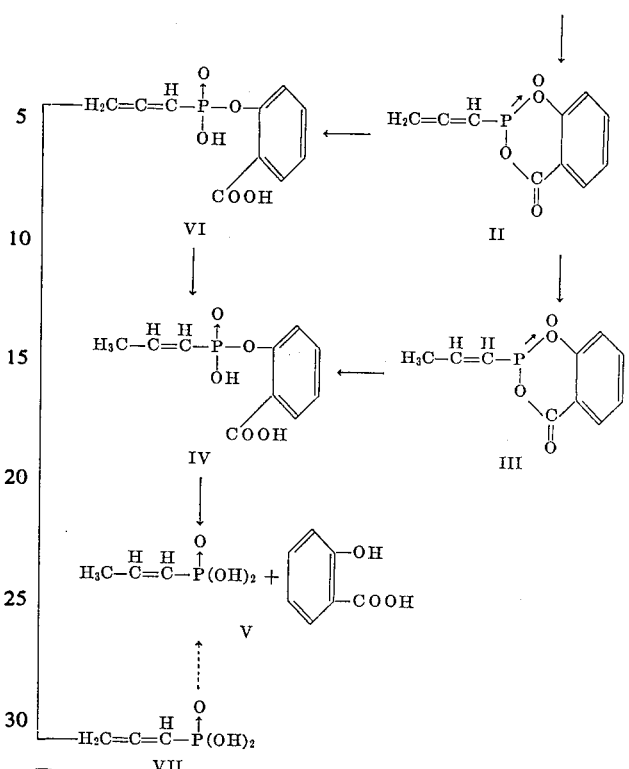

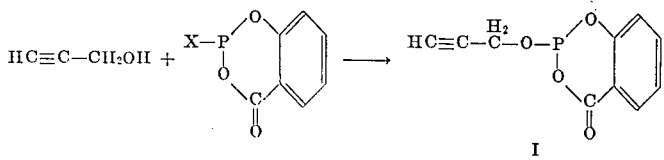

In the foregoing flowsheet X represents halogen, preferably chloro or bromo.

The cis-1-propenylphosphonic acid obtained as described herein is useful in making salts of (±) (cis-1,2-epoxypropyl)phosphonic acid and of (−) (cis-1,2-epoxypropyl)phosphonic acid, which compounds have antibacterial activity, as described in Belgian Pat. No. 723,072.

In the first step of this process a 2-halo-4-oxo-1,3-dioxa-2-phosphanaphthalene [J. Chem. Soc., 1249, (1960)] is reacted with propargyl alcohol to afford 2-propargyloxy-4-oxo-1,3-dioxa-2-phosphanaphthalene. The reaction is conducted in a suitable organic solvent medium. It is preferred for best yields that water be excluded to the extent practical and for this reason, anhydrous non-polar organic solvents such as benzene, toluene, xylene, hexane, tetrahydrofuran, and diethyl ether are employed. It is also preferable that the reaction be conducted in an inert atmosphere such as under nitrogen or carbon dioxide. The two reactants are employed in essentially equimolar amounts. Since 1 mole of hydrohalic acid is formed in the reaction, an acid binding agent and preferably a tertiary amine such as a triloweralkyl amine, e.g., trimethylamine or triethylamine, dimethylaniline, pyridine, a loweralkyl pyridine, and the like may be used to bind the acid. When an amine acid binding agent is employed, the amine hydrohalide precipitates from the anhydrous reaction mixture. In order for the next step of the process to proceed satisfactorily, removal of the amine salt is necessary at this point. However, it has been found that an acid binding agent is not necessary to the success of the process and in a preferred embodiment of this aspect of the invention the free hydrohalic acid that is generated is removed from the reaction medium, as by distillation, as it is formed. This modification permits one to carry out the reaction at an elevated temperature, which is advantageous but not satisfactory with the tertiary amine present. For best results in the above reaction, the propargyl alcohol is added to a solution of --halo-4-oxo-1,3-dioxa-2-phosphanaphthalene. The addition may be carried out as fast as the rate of reaction, i.e., to avoid high local concentrations of propargyl alcohol which may lead to formation of undesired by-products.

The 2-propargyloxy-4-oxo-1,3-dioxa-2-phosphanaphthalene rearranges readily and rapidly at elevated temperatures to 2-propadienyl-4-oxo-1,3-dioxa-2-phoshanaphthalene-2-oxide (II). Thus, when the propargyl alcohol reaction discussed above is carried out at temperatures below room temperature, the rearrangement of the propargyloxy compound (I) to the propadiene (II) is relatively slow. However, under the preferred conditions of effecting the first step of our process at elevated temperatures of from about 50°–130° C. and in the absence of an acid acceptor, the rearrangement occurs rapidly and the desired 2-propadienyl-4-oxo-1,3-dioxa-2-phosphanaphthalene-2-oxide is formed almost immediately from the propargyloxy compound. Thus, from the standpoint of isolation or recovery, the diene (II) is the first recoverable product when the optimum conditions of elevated temperature and absence of base are utilized.

The propadiene (II) may be isolated if desired but this is not necessary and is not preferred because that material is formed in sufficiently pure state to permit its use directly without purification in the next step of the process.

In the next step of the preferred embodiment of this invention, 2-propadienyl-4-oxo-1,3-dioxa-2phosphanaphthalene-2-oxide (II) is selectively reduced to 2-(1'-cis-propenyl)-4-oxo-1,3-dioxa-2-phosphanaphthalene-2-oxide (III). The selective reduction is brought about by hydrogenation in the presence of an appropriate catalyst. The preferred catalyst is Raney nickel or palladium on a suitable support such as activated carbon, calcium carbonate, and the like. The temperature is not critical, and the hydrogenation is conveniently carried out at temperatures of from about 15°–50° C. The hydrogen uptake is rapid and the theoretical amount of hydrogen is normally absorbed in from about ½ to 4 hours. This reduction of Compound II is highly selective, and essentially no over-reduction takes place.

According to a preferred aspect of the invention, the rate of catalytic hydrogenation and the yield of desired product is improved by utilizing a minor amount of a tertiary alcohol as a "co-solvent." Suitable alcohols are t-butanol, t-amyl alcohol and t-hexanol, although any tertiary alcohol is suitable. The amount of alcohol is not unduly critical, and from about 0.05–0.5 moles per mole of propadiene are satisfactory, and preferably from about 0.1–0.3 moles. In the absence of tertiary alcohol, fresh catalyst may be added if the hydrogenation is sluggish.

The primary solvent may be any of the organic solvents discussed hereinabove as suitable for the first step of the process. This is a significant advantage in that it permits the catalytic hydrogenation to be carried out without isolation of the 2-propadienyl-4-oxo-1,3-dioxa-2-phosphanaphthalene-2-oxide.

In the next step of the process of this invention, the 2-(1'-cis-propenyl)-4-oxo-1,3-dioxa-2-phosphanaphthalene-2-oxide is hydrolyzed with water to the o-carboxy-phenyl ester of cis-propenylphosphonic acid (IV). Splitting of the anhydride linkage occurs very readily in the presence of water even at temperatures of about 5°–10° C., and for this reason the hydrolysis is conveniently conducted at about room temperature. The reaction is slightly exothermic so that a modest temperature rise occurs. The hydrolysis may be brought about by adding water to pure or substantially pure phosphanaphthalene-2-oxide of Formula III above, or by adding water to an organic solvent solution of the ester. The resulting o-carboxyphenyl ester is water-soluble and is preferably hydrolyzed further without isolation to cis-propenylphosphonic acid (V). For best results, hydrolysis of the o-carboxyphenyl ester is brought about in an aqueous solution at elevated temperatures of from about 60° C. to the reflux temperature. The reaction occurs more quickly in the presence of a minor amount of mineral acid and preferably a hydrohalic acid such as hydrochloric or hydrobromic acid. At the reflux temperature the hydrolysis is substantially complete in from about ½ to 5 hours. Minor amounts of a mineral acid and particularly a hydrohalic acid such as hydrochloric or hydrobromic acids, may be used to catalyze the hydrolysis. This is not, however, necessary because the o-carboxyphenyl ester and the resulting cis-propenylphosphonic acid are sufficiently acidic to catalyze the hydrolysis. Salicylic acid is generated and is conveniently separated from the desired phosphonic acid by filtration since the salicylic acid crystallizes upon cooling of the hydrolysis reaction mixture to a temperature of about 0°–10° C. The cis-1-propenylphosphonic acid may be recovered from the aqueous solution by techniques known in the art, such as the removal of the water under reduced pressure. A virtue of this process is that the byproduct salicylic acid is obtained in substantially pure form and may be re-used to prepare the starting material 2-halo-4-oxo-1,3-dioxa-2-phosphanaphthalene.

As will be noted from the foregoing Flow Diagram, it is also within the purview of this invention that the 2-propadienyl-4-oxo-1,3-dioxa-2-phosphanaphthalene-2-oxide (II) be hydrolyzed to the o-carboxyphenyl ester of propadienylphosphonic acid (VI), and that this material be selectively reduced to the corresponding 1'-propenyl compound (IV). This hydrolysis and reduction is brought about in a similar fashion to that previously described for the reduction of Compound II above to Compound III and hydrolysis of III. Since the o-carboxyphenyl ester IV is water soluble, the hydrogenation may be conducted in an aqueous medium although care should be taken to avoid over-reduction since in aqueous medium the absorption of hydrogen continues after reduction of the β–γ double bond with the result that the o-carboxyphenyl ester of propylphosphonic acid may be obtained unless the reduction is terminated after absorption of 1 mole of hydrogen per mole of starting material.

Alternatively, the o-carboxyphenyl ester of propadienylphosphonic acid may be hydrolyzed to propadienylphosphonic acid under the conditions previously described for hydrolysis of such an ester grouping. If desired, this allenic free acid may then be hydrogenated in the presence of a palladium catalyst to cis-1-propenylphosphonic acid.

Although the processes of this invention have been described hereinabove and are exemplified hereinafter with respect to formation of propenyl and propadienylphosphonic acids from propargyl alcohol, it should be understood that other β–γ acetylenic alcohols may be employed as staring material with the resulting formation of the corresponding α:β unsaturated cis-phosphonic acid. Examples of other starting materials that might be mentioned are 3-butyn-2-ol, 2-methyl-3-butyn-2-ol and 3-methyl-4-pentyn-3-ol.

As previously stated, the process described above wherein salicylic acid is used as the ester blocking group for the phosphite and phosphonate intermediates is of substantial benefit since it permits the synthesis of cis-propenylphosphonic acid from propargyl alcohol in over-all yields greater than 80 percent since the entire reaction sequence can if desired be carried out without isolation and/or purification of the intermediate products, and since salicylic acid is obtained on hydrolysis of the o-carboxy-phenylphosphonate esters in sufficiently pure state to permit its reuse in preparing the starting material 2-chloro-4-oxo-1,3-dioxa-2-phosphanaphthalene.

The following examples are given for the purpose of illustration and not by way of limitation.

EXAMPLE 1

To a refluxing mixture of 21 g. of 2-chloro-4-oxo-1,3-dioxa-2-phosphanaphthalene in 90 ml. of toluene is added a solution of 5.6 g. of propargyl alcohol in 20 ml. of anhydrous toluene with good stirring over a period of 30 minutes. During the addition of propargyl alcohol at the boiling point of toluene 2-propargyloxy-4-oxo-1,3-dioxa-2-phosphanaphthalene is formed. This product rearranges under the reaction conditions to 2-propadienyl-4-oxo-1,3-dioxa-2-phosphanaphthalene-2-oxide.

At the end of the propargyl alcohol addition the toluene solution of 2-propadienyl-4-oxo-1,3-dioxa-2-phosphanaphthalene-2-oxide is cooled to 20°–25° C. To it is added 7.4 g. of t-butanol. The product is hydrogenated at 40 lbs./psi with 1.0 g. of 5 percent palladium on charcoal catalyst. The theoretical amount of hydrogen is absorbed in 1 to 3 hours. The catalyst is removed by filtration and washed with 2 × 2 ml. of toluene. The combined filtrates and washes are concentrated in vacuo and the oily residue of 2-(1'-cis-propenyl)-4-oxo-1,3-dioxa-2-phosphanaphthalene-2-oxide weighting 22.5 gm. is used directly in the next reaction without any purification Into a 500 ml. three-necked flask, equipped with stirrer, and reflux condenser is charged at room temperature 105 ml. of water and 22.5 g. of 2-(1'-cis-propenyl)-4-oxo-1,3-dioxa-2-phosphanaphthalene-2-oxide. The original two-phase system becomes homogeneous and a clear solution of o-carboxyphenyl-cis-1-propenylphosphonate is produced. This reaction is slightly exothermic and the temperature rises from 25° to 35° C.

To the resulting solution 2.4 ml. of concentrated hydrochloric acid is added and the mixture refluxed for 2 hours. The solution is cooled to 0° to 5° C., aged for one hour and the crystalline salicylic acid is separated by filtration. The filtrate is extracted with 3 × 2 ml. of ether. The ethereal extracts are separated and discarded. The aqueous layer is concentrated in vacuo (17–20 mm; water bath at 60° C.) to a small volume and flushed twice with benzene to reduce the water content. After removal of the benzene there is obtained cis-1-propenylphosphonic acid as a yellow to light brown oil which crystallizes on seeding. The yield is 85–90 percent of the theoretical.

A similar result is obtained when the above procedure is repeated but no hydrochloric acid is added (in the immediately preceding paragraph) before the 2-hour reflux period.

EXAMPLE 2

To a solution of 42 g. of 2-chloro-4-oxo-1,3-dioxa-2-phosphanaphthalene in 200 ml. of anhydrous benzene there is added a solution of 20.8 g. of triethylamine and 11.6 g. of propargyl alcohol in 200 ml. of dry benzene at 5°–10° C. in a nitrogen atmosphere. The reaction mixture is aged for 1 hour at 25° C. during which time triethylamine hydrochloride precipitates. The solid is removed by filtration and washed with three 20 ml. portions of benzene. The filtrate contains 2-propargyloxy-4-oxo-1,3-dioxa-2-phosphanaphthalene.

The benzene solution obtained above is combined with the benzene washes and the entire solution heated at 75°–80° C. for 3 hours. During this time the product rearranges to 2-propadienyl-4-oxo-1,3-dioxa-2-phosphanaphthalene-2-oxide. This product is used directly in the next step without isolation and purification.

To the benzene solution of 2-propadienyl-4-oxo-1,3-dioxa-2-phosphanaphthalene-2-oxide obtained above there is added 2 g. of 5 percent palladium on charcoal catalyst and the mixture hydrogenated at room temperature under a hydrogen pressure of 40 lbs./psi. The theoretical amount of hydrogen is absorbed in 1–1.5 hours. At the end of this time the catalyst is separated by filtration, washed with two 5 ml. portions of benzene, and the combined filtrate and washes concentrated in vacuo at 40°–45° C. to constant weight. There is obtained an oil consisting of 2-(1'-cis-propenyl)-4-oxo-1,3-dioxaphosphanaphthalene-2-oxide.

The phosphanaphthalene-2-oxide obtained as described in the preceding paragraph is dissolved in 200 ml. of water. One ml. of concentrated hydrochloric acid is added, and the solution heated under gentle reflux for 60 minutes. The solution is then cooled to 5° C. and the solid salicylic acid separated by filtration. The filtrate is extracted with two 30 ml. portions of ethyl acetate in order to remove any solubilized salicylic acid. The organic extracts are discarded and the aqueous solution concentrated in vacuo to constant weight to afford an oilyresidue of cis-1-propenylphosphonic acid which crystallizes on standing, m.p. 59°–61° C.

EXAMPLE 3

To a solution of 2.22 g. of 2-propadienyl-4-oxo-1,3-dioxa-2-phosphanaphthalene-2-oxide in 15 ml. of carbon tetrachloride there is added with good agitation 180 mg. of water. The reaction mixture is stirred for one hour at room temperature and then cooled to 0° C. Orthocarboxyphenyl propadienylphosphonate crystallizes and is recovered by filtration.

EXAMPLE 4

2.4 g. of o-carboxyphenyl propadienylphosphonate is dissolved in 10 ml. of water and the resulting solution refluxed for 4 hours. The solution is then cooled to 0° C., the precipitated salicylic acid removed by filtration and the aqueous filtrate concentrated in vacuo to an oil consisting of propadienylphosphonic acid.

EXAMPLE 5

To a solution of 12 g. of propadienylphosphonic acid and 60 ml. of water there is added 1 g. of palladium on charcoal catalyst. The mixture is hydrogenated at room temperature under 15 psi until the theoretical amount of hydrogen is absorbed. The catalyst is then removed by filtration and the filtrate concentrated in vacuo to a small volume. The residue is flushed with small portions of benzene to remove the last remaining water and to afford a yellow oil of cis-1-propenylphosphonic acid.

EXAMPLE 6

2.4 g. of 2-(cis-1'-propenyl)-4-oxo-1,3-dioxa-2-phosphanaphthalene-2-oxide is dissolved in 20 ml. of water. The water is removed in vacuo at room temperature and the residue is flushed with benzene to remove the last traces of water. The solid residue thus obtained is recrystallized from 10:3 chloroform:n-hexane to give crystalline o-carboxyphenyl-cis-1-propenylphosphonate, m.p. 85°–90° C. The monobenzyl ammonium salt obtained on treatment of the mono ester with benzylamine melts at 143°–144° C.

EXAMPLE 7

To a solution of 2.2 g. of 2-propadienyl-4-oxo-1,3-dioxa-2-phosphanaphthalene-2-oxide in 20 ml. of anhydrous benzene there is added 150 mg. of 5 percent palladium on carbon catalyst; the mixture is hydrogenated at 15 psi until the theoretical amount of hydrogen is absorbed. The catalyst is then separated by a filtration and the filtrate concentrated to dryness in vacuo. The remaining residue is recrystallized from carbon tetrachloride to afford 2-(cis-1-propenyl)-4-oxo-1,3-dioxa-2-phosphanaphthalene-2-oxide as white hygroscopic crystals, m.p. 55°–57° C.

EXAMPLE 8

2.5 g. of o-carboxyphenyl cis-1-propenylphosphonate is dissolved in 25 ml. of water, and the mixture refluxed for 3 hours. The solution is then cooled to 0° C. and filtered to remove salicylic acid. The filtrate is concentrated in vacuo to constant weight to given an oily residue of cis-1-propenylphosphonic acid which crystallizes on standing at room temperature, m.p. 55°–58 C.

Any departure from the above description which conforms to the present invention is intended to be included within the scope of the claims.

What is claimed is:

1. 2-Propadienyl-4-oxo-1,3-dioxa-2-phosphanaphthalene-2-oxide.

* * * * *